US009083212B2

United States Patent
Fairman et al.

(10) Patent No.: US 9,083,212 B2
(45) Date of Patent: Jul. 14, 2015

(54) OVERHUNG TURBINE AND GENERATOR SYSTEM WITH TURBINE CARTRIDGE

(71) Applicant: Concepts ETI, Inc., White River Junction, VT (US)

(72) Inventors: Kevin Fairman, Lunenburg, MA (US); Francis A. Di Bella, Boston, MA (US); David Japikse, Woolwich, ME (US); Frederick E. Becker, Reading, MA (US); Alexander Gofer, Hanover, NH (US)

(73) Assignee: Concepts ETI, Inc., White River Junction, VT (US)

( * ) Notice: Subject to any disclaimer, the term of this patent is extended or adjusted under 35 U.S.C. 154(b) by 0 days.

(21) Appl. No.: 13/937,978

(22) Filed: Jul. 9, 2013

(65) Prior Publication Data

US 2015/0037136 A1 Feb. 5, 2015

Related U.S. Application Data

(60) Provisional application No. 61/699,649, filed on Sep. 11, 2012.

(51) Int. Cl.
*F01D 15/10* (2006.01)
*H02K 7/18* (2006.01)
(Continued)

(52) U.S. Cl.
CPC .............. *H02K 7/1823* (2013.01); *F01D 5/06* (2013.01); *F01D 15/10* (2013.01); *F01D 25/16* (2013.01);
(Continued)

(58) Field of Classification Search
CPC ......... F01D 25/16; F01D 13/00; F01D 15/00; F01D 15/10; F01D 1/04; F01D 1/10; F04D 29/0476; F01K 9/003; F01K 11/02
USPC ............ 415/198.1, 199.1, 199.4, 199.5, 203, 415/207, 208.1, 208.2, 211.1, 218.1, 220, 415/90; 416/198 R, 198 A, 201 R, 201 A
See application file for complete search history.

(56) References Cited

U.S. PATENT DOCUMENTS 4,362,020 A * 12/1982 Meacher et al. ................ 60/657
5,628,191 A 5/1997 Kueck et al.
(Continued)

FOREIGN PATENT DOCUMENTS

WO 2011149916 A1 12/2011

OTHER PUBLICATIONS

"Axial and Radial Turbines," by Hany Moustapha et al., Concepts NREC, Library of Congress Catalog Card No. 2001135011, 2003, pp. 346-351.
(Continued)

*Primary Examiner* — Edward Look
*Assistant Examiner* — Christopher J Hargitt
(74) *Attorney, Agent, or Firm* — Downs Rachlin Martin PLLC

(57) ABSTRACT

A turbine-generator device for use in electricity generation using heat from industrial processes, renewable energy sources and other sources. The generator may be cooled by introducing into the gap between the rotor and stator liquid that is vaporized or atomized prior to introduction, which liquid is condensed from gases exhausted from the turbine. The turbine has a universal design and so may be relatively easily modified for use in connection with generators having a rated power output in the range of 50 KW to 5 MW. Such modifications are achieved, in part, through use of a modular turbine cartridge built up of discrete rotor and stator plates sized for the desired application with turbine brush seals chosen to accommodate radial rotor movements from the supported generator. The cartridge may be installed and removed from the turbine relatively easily for maintenance or rebuilding. The rotor housing is designed to be relatively easily machined to dimensions that meet desired operating parameters.

27 Claims, 13 Drawing Sheets

(51) Int. Cl.
| | |
|---|---|
| F01D 25/16 | (2006.01) |
| F01D 25/24 | (2006.01) |
| F01K 25/08 | (2006.01) |
| F01K 27/02 | (2006.01) |
| H02K 7/09 | (2006.01) |
| F01D 5/06 | (2006.01) |
| F02C 7/06 | (2006.01) |

(52) U.S. Cl.
CPC ............... *F01D 25/24* (2013.01); *F01K 25/08* (2013.01); *F01K 27/02* (2013.01); *H02K 7/09* (2013.01); *F02C 7/06* (2013.01); *F05D 2220/31* (2013.01); *F05D 2220/76* (2013.01); *F05D 2240/51* (2013.01); *F05D 2240/54* (2013.01); *F05D 2240/56* (2013.01); *Y02E 10/34* (2013.01)

(56) References Cited

U.S. PATENT DOCUMENTS

| | | | |
|---|---|---|---|
| 7,146,999 | B2 | 12/2006 | Giese et al. |
| 7,726,331 | B1 | 6/2010 | Giese |
| 8,146,360 | B2 | 4/2012 | Myers et al. |
| 2003/0038553 | A1 | 2/2003 | Andres et al. |
| 2009/0277400 | A1* | 11/2009 | Conry .............................. 123/2 |
| 2010/0327534 | A1* | 12/2010 | Powar et al. ................. 277/355 |
| 2012/0306206 | A1 | 12/2012 | Agrawal et al. |

OTHER PUBLICATIONS

The Chena Power Clean Biomass Power Plant; http://www.chenapower.com/biomass-power-plant; China Power LLC, 2012; last viewed on Jul. 3, 2013.

"How to Recover Waste Heat From Turbomachinery," by Herman Artinian, Gas Turbines, Turbomachinery International, Sep./Oct. 2012, pp. 40-41.

International Search Report and Written Opinion dated May 27, 2014 in corresponding International Application No. PCT/US2013/059275.

https://www.scribd.com/doc/86181925/Background-and-Summary-of-Commercial-ORC-Development-and-Exploitation. Publishing Limited, Oxford 2011.

ORC Turbines—Organic Rankine Cycle Turbines by Verdicorp. http://www.orcturbines.com. Last viewed on Oct. 24, 2014.

"ORegen and Waste Heat Recovery Solution Presentation," by Andrea Burrato and Massimo Stolzuoli. Milano, Italy Jul. 11, 2013.

"HRS Clean Cycle Heat-to-Power Generator 125 kw, by y Solution Presentation," https://www.ge-distributedpower.com/products/heat-recovery-solutions. 2014 General Electric Company.

"Development of a 125 kW AMB Expander/Generator for Waste Heat Recovery," by Lawrence A. Hawkins, Lei Zhu and Eric J. Blumber. J. Eng. Gas Turbines Power 133(7), 072503, Mar. 16, 2011.

"Advanced Microturbine Systems"—Prepared for US DOE Award No. DE-FC26-OOCH11060 Report No. DOE/CH/11060-1. 2008 Images Courtesy of www.InfinityTurbine.com.

"Infinity Tube—New Modular ORC Turbine," http://www.metacafe.com/watch/yt-DAm0eXYmvGU/infinity_turbine_new_modular_orc_turbine/ Feb. 8, 2010.

"Technological and Economical Survey of Organic Rankine Cycle Systems," by Sylvain Quoilin and Vincent Lemort. 5th European Conference Economics and Management of Energy In Industry. Hotel D. Pedro Golf Resort, Vilamoura, Algarve, Portugal Apr. 14-17, 2009.

\* cited by examiner

OVERHUNG TURBINE AND GENERATOR SYSTEM WITH TURBINE CARTRIDGE

RELATED APPLICATION DATA

This application is a non-provisional of U.S. Provisional Patent Application Ser. No. 61/699,649, filed Sep. 11, 2012, entitled "Axial Overhung Turbine and Generator System For Use In An Organic Rankine Cycle," which is incorporated by reference herein in its entirety.

FIELD OF THE INVENTION

The present invention generally relates to the field of turbine generator power systems for industrial waste heat recovery and other applications. In particular, the present invention is directed to an overhung turbine coupled to a direct-drive, electrical power generator.

BACKGROUND

Concerns about climate change and rising energy costs, and the desire to minimize expenses in various industrial operations, together lead to an increased focus on capturing waste heat developed in such operations. Organic Rankine Cycle ("ORC") turbine generator electrical power systems have been used in industrial waste heat recovery. Unfortunately, known systems for capturing waste heat and converting it to electricity are often too large for the space available in certain industrial operations, are less efficient than desired, require more heat to operate efficiently than is available, are too expensive to manufacture for certain applications, or require more maintenance than is desired. In other applications, such as geothermal energy recovery and certain ocean thermal energy projects, abundant heat is available and an efficient ORC system is a satisfactory means for conversion of such heat to electricity. Even in such other applications, however, known ORC systems tend to be too expensive for some such applications, are less efficient than desired and/or require more maintenance than is desired.

SUMMARY OF THE INVENTION

In one implementation, the present disclosure is directed to a system for conversion of heat energy into electricity. The system includes an electric generator having a power output of 5 MW or less, said generator having a proximal end, a distal end, a generator rotor and a stator, said generator rotor being disposed for rotational movement within said stator about a rotational axis, said generator also including a first magnetic radial bearing positioned adjacent said proximal end, and a second magnetic radial bearing positioned adjacent said distal end, said first and second magnetic radial bearings surrounding said generator rotor and retaining said generator rotor, during operation, in substantially coaxial alignment with respect to said rotational axis; and a turbine having at least one stator and at least one turbine rotor supported for rotational movement relative to said at least one stator about said rotational axis, said at least one turbine rotor being coupled with said generator rotor so as to rotationally drive said generator rotor, said turbine having a first end attached to said proximal end of said generator, wherein said at least one turbine rotor has an overhung configuration such that no radial bearings are included in said turbine for radially supporting said at least one turbine rotor for rotational movement, said turbine further including an inlet for receiving a working fluid at a first temperature and an outlet for exhausting said working fluid at a second temperature lower than said first temperature, said outlet being position proximate said first end of said turbine so as to minimize heat transfer to said generator.

In another implementation, the present disclosure is directed to a system for conversion of heat energy into electricity. The system includes an electric generator having a power output of 5 MW or less, said generator having a proximal end, a distal end, a generator rotor and a stator, said generator rotor being disposed for rotational movement within said stator about a rotational axis, said generator also including a first fluid film bearing positioned adjacent said proximal end, and a second fluid film bearing positioned adjacent said distal end, said first and second fluid film bearings surrounding said generator rotor and retaining said generator rotor, during operation, in substantially coaxial alignment with respect to said rotational axis; and a turbine having at least one stator and at least one turbine rotor supported for rotational movement relative to said at least one stator about said rotational axis, said at least one turbine rotor being coupled with said generator rotor so as to rotationally drive said generator rotor, said turbine having a first end attached to said proximal end of said generator, wherein said at least one turbine rotor has an overhung configuration such that no radial bearings are included in said turbine for radially supporting said at least one turbine rotor for rotational movement, said turbine further including an inlet for receiving a working fluid at a first temperature and an outlet for exhausting said working fluid at a second temperature lower than said first temperature, said outlet being position proximate said first end of said turbine so as to minimize heat transfer to said generator.

In yet another implementation, the present disclosure is directed to an axial turbine with interchangeable components. The axial turbine includes a housing having an interior and a first axis of rotation; a plurality of rotor plates, each having a centerline, a first contact surface and a second contact surface contacting said first surface, said first and second contact surfaces being substantially parallel and each of said first and second contact surfaces being flat in the range 0.00005" to 0.020", wherein said plurality of rotor plates are positioned proximate one another so that said centerlines thereof are mutually coaxial and are coaxial with said first axis of rotation so as to define rotor portions of a multi-stage rotor assembly, each of said plurality of rotor plates having a radially outermost portion; a plurality of stator plates, each having a centerline, a first contact surface and a second contact surface contacting said first surface, said first and second surfaces being substantially parallel and each of said first and second surfaces being flat in the range 0.00005" to 0.020", wherein said plurality of stator plates are positioned proximate one another so that said centerlines of said stator plates are mutually coaxial and are coaxial with said first axis of rotation so as to define stator portions of a multi-stage stator assembly, each of said plurality of stator plates having a radially innermost portion; wherein said plurality of rotor plates are positioned in alternating relationship with corresponding respective ones of said plurality of stator plates so as to define a multi-stage rotor assembly with an upstream direction, further wherein at least one of said plurality of rotor plates includes a first plurality of vanes with an axial chord and an adjacent one of said plurality of stator plates includes a second plurality of vanes with an axial chord, wherein said first plurality of vanes is axially spaced from said second plurality of vanes to define a space having an axial dimension that is no more than two axial chords to ¼ of 1% of an axial chord, as measured with respect to the axial chord of the one of said rotor plate and stator plate immediately upstream of said space.

In yet another implementation, the present disclosure is directed to a system for converting heat energy into electricity. The system includes a turbine having an inlet, an outlet, a stator and a turbine rotor, wherein said turbine is configured to receive a first volume of working fluid via said inlet and to exhaust said first volume of working fluid via said outlet, wherein said turbine rotor rotates about a rotational axis; a generator coupled with said turbine, said generator having a stator and a generator rotor, said generator rotor being coupled with said turbine rotor so as to be rotatably driven by said turbine rotor about said rotational axis, said generator including a gap between said generator rotor and said stator for receiving a second volume of said working fluid, said gap having an entrance port and an exit port; and wherein said first volume of said working fluid has a higher temperature than said second volume of working fluid when introduced into said gap and said second volume of working fluid present in said gap cools said generator rotor and said stator.

In yet another implementation, the present disclosure is directed to a multi-stage turbine cartridge. The turbine cartridge includes a plurality of rotor plates, each having a centerline, a first contact surface and a second contact surface contacting said first contact surface, said first and second contact surfaces being substantially parallel and each of said first and second contact surfaces being flat in the range 0.00005" to 0.020", wherein said plurality of rotor plates are positioned proximate one another so that said centerlines of said rotor plates are mutually coaxial; a plurality of stator plates, each having a centerline, a first contact surface and a second contact surface contacting said first surface, said first and second contact surfaces being substantially parallel and each of said first and second contact surfaces being flat in the range 0.00005" to 0.020", wherein said plurality of stator plates are positioned proximate one another so that said centerlines of said stator plates are mutually co-axial; and wherein said plurality of rotor plates are positioned in alternating relationship with corresponding respective ones of said plurality of stator plates so as to define a multi-stage rotor assembly with an upstream direction, further wherein at least one of said plurality of rotor plates includes a first plurality of vanes with an axial chord and an adjacent one of said plurality of stator plates includes a second plurality of vanes with an axial chord, wherein said first plurality of vanes is axially spaced from said second plurality of vanes to define a space having an axial dimension that is no more than two axial chords to ¼ of 1% of an axial chord, as measured with respect to the axial chord of the one of said rotor plate and stator plate immediately upstream of said space.

In yet another implementation, the present disclosure is directed to a system for conversion of heat energy into electricity. The system includes an electric generator having a proximal end, a distal end, a generator rotor and a stator, said generator rotor being disposed for rotational movement within said stator about a rotational axis, said generator also including a first magnetic radial bearing positioned adjacent said proximal end and a second magnetic radial bearing positioned adjacent said distal end, said first and second magnetic radial bearings surrounding said generator rotor and retaining said generator rotor, during operation, in substantially coaxial alignment with respect to said rotational axis; and a turbine having at least one stator and at least one turbine rotor supported for rotational movement within said at least one stator about said rotational axis, said at least one turbine rotor being coupled with said at least one generator rotor so as to rotationally drive said generator rotor, said at least one turbine rotor being attached to said proximal end of said generator in an overhung configuration such that no radial bearings are included in said turbine for radially supporting said at least one turbine rotor for rotational movement, said at least one turbine rotor having a radially outermost surface and said at least one stator having a radially innermost surface, said turbine further including at least one seat, a first brush seal engaging said radially outermost surface of said at least one rotor, and a second brush seal engaging said at least one seat.

In yet another implementation, the present disclosure is directed to a method of making a turbine for driving a generator, said turbine having a power output sufficient to drive the generator to produce electric power in the range 50 KW to 5 MW. The method includes providing a universal turbine hood having a floor with a first thickness; providing a rotor stage having a radial height, the rotor stage positioned in the turbine hood; and machining material away from the hood to decrease the thickness of the floor and machining material away to decrease the radial height of the rotor stage, said machining performed so as to produce a turbine having a power output sufficient to drive the generator to produce a maximum electric power output at a target value in the range 50 KW to 5 MW.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5 is cross-sectional view of one embodiment of a turbine cartridge usable in the turbine shown in FIG. 4a;

FIG. 7 is a perspective view showing the relative placement of two stator plates and one rotor plate with its stationary spacer plate used in a multi-stage embodiment of the turbine depicted in FIG. 4a;

DETAILED DESCRIPTION

The present disclosure is directed to a turbine powered electrical generator for use in an Organic Rankine Cycle (ORC), Kalina cycle, or other similar cycles, industrial operations that generates waste heat, or in connection with other heat sources, e.g., a solar system or an ocean thermal system. High-pressure hot gas from a boiler, which is heated by the heat source, enters the turbine housing and is expanded through the turbine to turn the rotor, which turns the generator shaft to generate electricity, as described more below.

Figure 1:
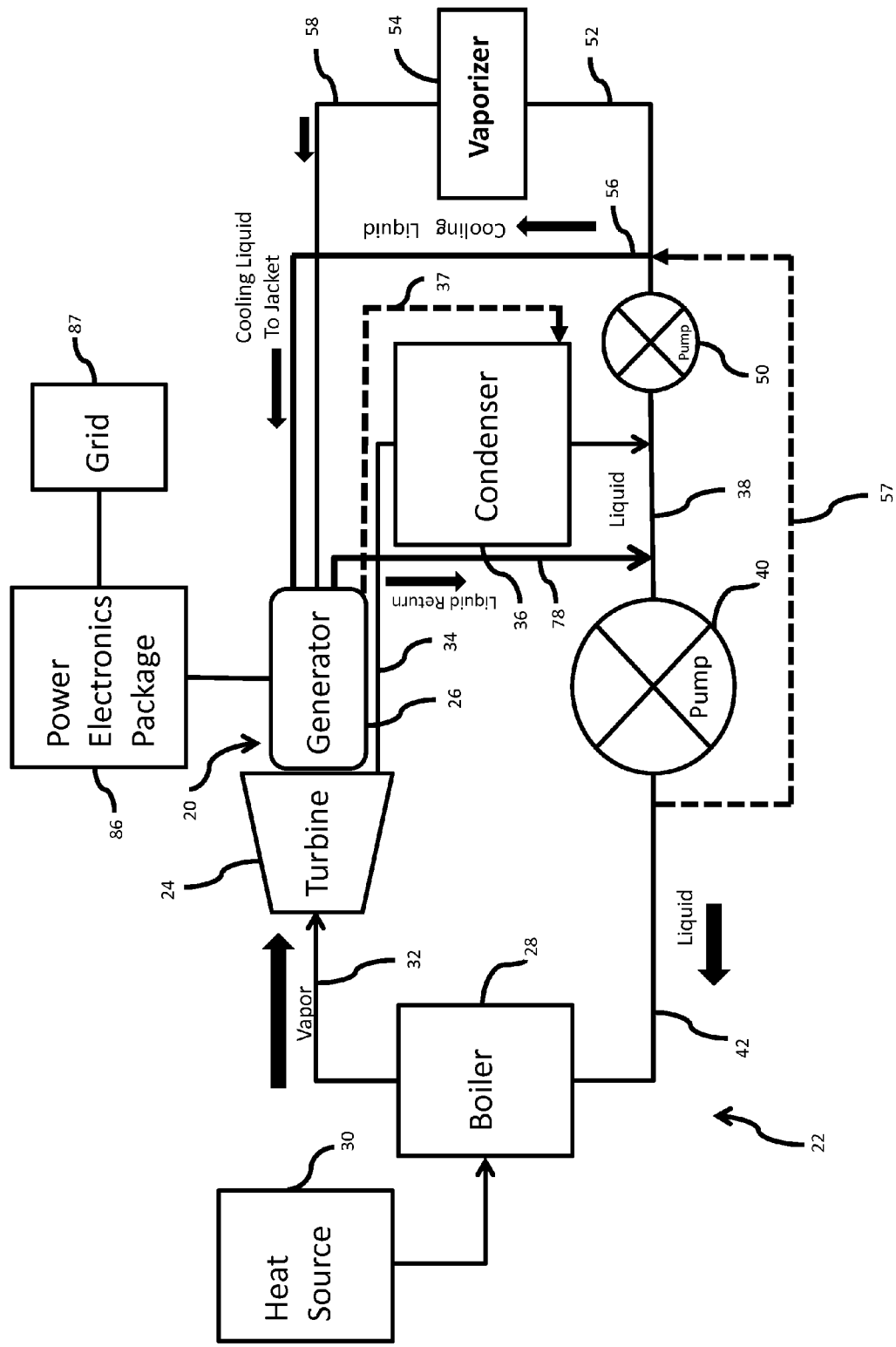
FIG. 1 is a schematic depiction of an ORC turbine-generator system.

Referring to FIG. 1, turbine-generator assembly 20 is intended for use in an ORC system 22. For convenience of discussion, system 22 is referred to and described as ORC system 22. It is, however, to be appreciated that other thermodynamic processes, such as a Kalina cycle process and bottoming cycle processes, are also encompassed by the present invention. Turbine-generator assembly 20 includes a turbine 24 and a generator 26 connected to, and driven by, the turbine. Before discussing turbine-generator assembly 20 in more detail, discussion of ORC system 22 is provided.

ORC system 22 includes a boiler 28 that is connected to a heat source 30, such as waste heat from an industrial process. Boiler 28 provides high-pressure hot vapor via connection 32 to turbine 24. As discussed more below, the hot vapor, aka, the working fluid, is expanded in turbine 24, where its temperature drops, and is then exhausted from the turbine and delivered via fluid connection 34 to condenser 36. In condenser 36, the vapor cooled in turbine 24 is cooled further, typically to a liquid state, and then a first volume of such liquid is delivered via fluid connection 38 to pump 40, where the liquid is returned via connection 42 to boiler 28. This liquid is then reheated in boiler 28 by heat from heat source 30 through a heat exchanger or other structure (none shown) in the boiler and then, repeating the cycle, is returned as high-pressure hot vapor via fluid connection 32 to turbine 24.

Figure 2:
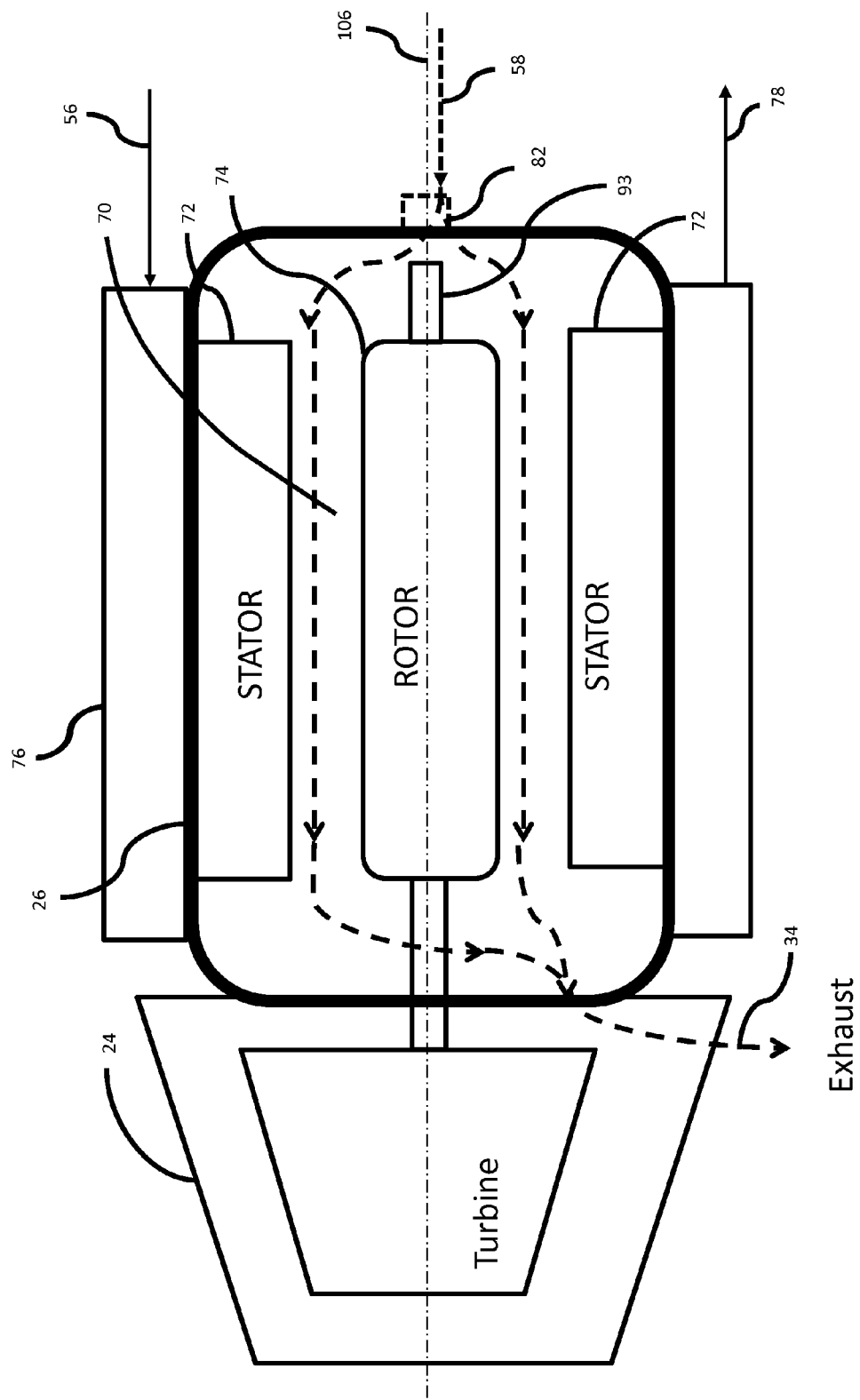
FIG. 2 is a schematic depiction of the turbine and generator of the system shown in FIG. 1, with interior details of the generator being schematically illustrated.

Turning now to FIGS. 1 and 2, a second volume of the cooled liquid exiting condenser 36 is, in one embodiment, delivered by pump 50 via fluid connection 52 to vaporizer 54 and from the vaporizer to generator 26 via fluid connection 58. Fluid from pump 50 is also delivered via fluid connection 56 to generator 26, in particular cooling jacket 76, discussed more below. In other embodiments, it may be desirable to omit pump 50 and instead deliver liquid that is output from pump 40 via fluid connection 57 to fluid connections 52 and 56. Vaporizer 54 vaporizes at least some of the second volume of liquid from condenser 36 and delivers the cooling vapor via fluid connection 58 to generator 26. As illustrated in FIG. 2, generator 26 includes a fluid gap 70, a stator 72 and a generator rotor 74, with the fluid gap (e.g., gas or atomized liquid) being positioned between the stator and rotor. Generator rotor 74 rotates relative to stator 72 about rotational axis 106.

Figure 3:
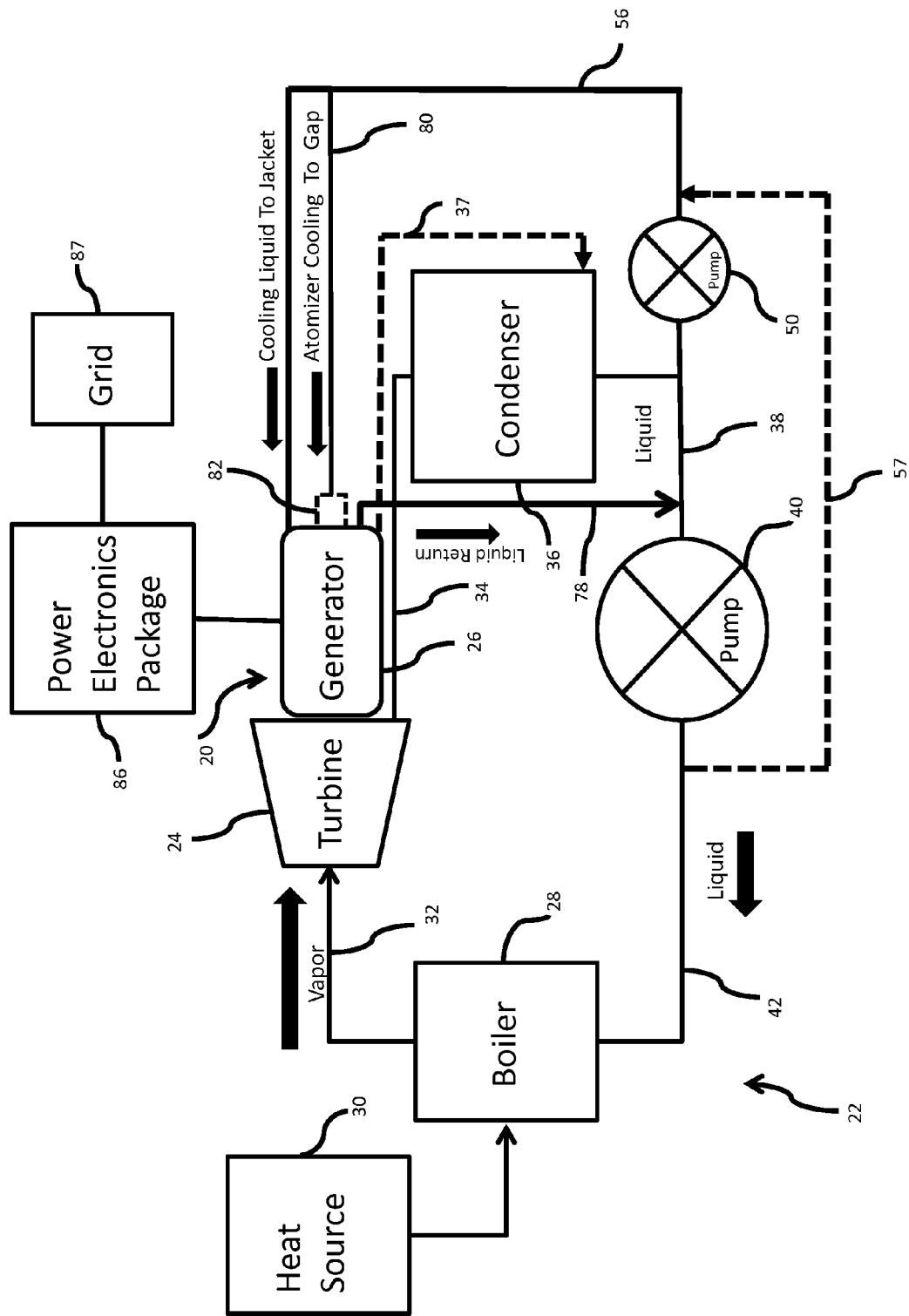
FIG. 3 is similar to FIG. 1, except that an alternative embodiment of the ORC turbine-generator system is depicted.

The cooling vapor is introduced into gap 70, and as the vapor passes through gap 70 it extracts heat from stator 72 and generator rotor 74, which vapor is then exhausted via fluid connection 34, along with the hot vapor exhausted from turbine 24, for cooling by condenser 36. Optionally, as illustrated in FIGS. 1 and 3, vapor exhausted from generator 26 may be delivered via fluid connection 37 directly to condenser 36 rather than being combined with vapor exhausted from turbine 24. Turbine 24 has a through flow rate and, in one embodiment, the second volume of the vapor (working fluid) introduced into gap 70 travels through the gap with a flow rate that is no more than 50% of the through flow rate. Typically, although not necessarily, generator 26 is hermetically sealed to ensure working fluid present in gap 70 does not escape except via fluid connection 34, or fluid connection 37, if provided.

Referring now to FIGS. 1-4, in one embodiment generator 26 is surrounded by a cooling jacket 76 (FIGS. 2 and 4) for cooling the generator. Cooling liquid pumped by pump 50 to generator 26 via fluid connection 56 is delivered to cooling jacket 76 via inlets 77 (FIG. 4). As the cooling liquid circulates through cooling jacket 76, it extracts heat from stator 72 and other components of generator 26. After completing its passage through cooling jacket 76, the cooling liquid, now somewhat hotter, is removed from generator 26 via fluid connection 78, after exiting fluid outlet 79 in the cooling jacket, and returned to condenser 36.

Turning next to FIGS. 2 and 3, in another embodiment of ORC system 22, atomized cooling liquid, rather than vaporized liquid, is provided to gap 70 in generator 26. Except as specifically discussed below, the embodiment of ORC system 22 illustrated in FIG. 3 is essentially identical to the embodiment of the system shown in FIG. 1, and so description of identical elements is not provided in the interest of brevity. Unlike the embodiment of ORC system 22 illustrated in FIG. 1, no vaporizer is provided in the embodiment illustrated in FIG. 3. Instead a portion of the cooling liquid delivered via fluid connection 56 to generator 26 is provided by fluid connection 80 to atomizer 82 positioned proximate to the generator. Atomizer 82 atomizes the cooling liquid, which is then delivered to gap 70 in generator 26, where the relatively cool atomized liquid extracts heat from stator 72 and generator rotor 74 as it travels through the gap, including through the latent heat of vaporization with respect to portions of the atomized liquid that are vaporized by the heat in the stator and rotor. The atomized liquid is then extracted from generator 26 via fluid connection 34 along with the working fluid exhausted from turbine 24. In FIGS. 2 and 3, atomizer 82 is depicted in dotted view to indicate that it is an optional element used in connection with one embodiment of the invention. As discussed above, in one embodiment, the second volume of the atomized liquid (working fluid) introduced into gap 70 travels through the gap with a flow rate that is no more than 50% of the through flow rate of turbine 24.

In some applications, it may be desirable to provide just cooling of stator 72 via cooling jacket 76, and not provide vapor or atomized liquid to gap 70. In other applications, the reverse may be desired.

Various high molecular weight organic fluids, alone or in combination, may be used as the working fluid in system 20. These fluids include refrigerants such as, for example, R125, R134a, R152a, R245fa, and R236fa. In other applications fluids other than high molecular weight organic fluids may be used, e.g., water and ammonia.

System 22 also includes a power electronics package 86 connected to generator 26. Package 86 converts the variable frequency output power from generator 86 to a frequency and voltage suitable for connection to the grid 87, e.g. 50 Hz and 400 V, 60 Hz and 480 V or other similar values.

Discussing generator 26 in more detail, in one embodiment the generator is a direct-drive, permanent magnetic, generator. Such a construction is advantageous because it avoids the need for a gearbox, which in turn results in a smaller and lighter system 20. Various aspects of the invention described herein may, of course, be effectively implemented using a generator having a gearbox mechanically coupled between turbine rotor 104 of turbine 24 and generator rotor 74 of generator 26, and a suitable wound rotor that does not include permanent magnets, e.g., a doubly wound, induction-fed rotor. In addition, in certain applications direct-drive synchronous generators may be used as generator 26. The rated power output of generator 26 will vary as a function of the intended application. In one embodiment, generator 26 has a rated power output of 5 MW. In another embodiment, generator 26 has a rated power output of 50 KW, and in yet other embodiments, generator 26 has a rated power output somewhere in between these values, e.g., 200 KW, 475 KW, 600 KW, or 1 MW. Rated power outputs for generator 26 other than those listed in the examples above are encompassed by the present invention.

To permit high-speed (e.g., on the order of 20,000-25,000 rpm) operation, and to minimize maintenance, it may be desirable in some embodiments of generator 26 to support generator rotor 74 for rotational movement using magnetic radial bearings 88 (see FIG. 4). In one embodiment, magnetic radial bearing 88a is positioned adjacent an end of generator rotor 74 proximate turbine 24 and magnet radial bearing 88b is positioned adjacent an opposite end of the rotor. As discussed more below, this placement of bearings 88 enables in large part the overhung construction of turbine 24. Similarly, axial movement of generator rotor 74 may be controlled through the use of magnetic axial thrust bearing 89. Magnetic radial bearings 88 and magnetic axial thrust bearing 89 are controlled by a controller 90 that adjusts power delivered to the bearings as a function of changes in radial and axial position of generator rotor 74, as detected by sensors (not shown) coupled to the controller, all as well known to those of ordinary skill in the art.

In another embodiment of the invention, fluid-film bearings may be used in place of magnetic radial bearings 88 and thrust bearing 89. For purposes of illustration, the schematic depiction of magnetic bearings 88 and 89 in FIG. 4 should be deemed to include, in the alternative, fluid-film bearings. As is known, fluid-film bearings support the total rotor load on a thin film of fluid, i.e., gas or liquid.

Optionally, in addition to magnetic bearings 88 and 89, rolling element radial bearings 92, e.g., radial bearings 92a and 92b, may be provided at opposite ends of rotor shaft 93 of generator rotor 74 surrounding the rotor shaft, typically adjacent magnetic bearings 88a and 88b, respectively. Rolling element radial bearings 92 support generator rotor 74 and its shaft 93 in substantially coaxial relation to rotational axis 106 when magnetic bearings 88 and 89 are not energized. More particularly, rolling element radial bearings 92 provide a rest point for generator rotor 74 when magnetic bearings 88 are not activated and provide a safe landing for the generator rotor in the event of a sudden electronic or power failure. It may be desirable in some cases to size rolling element radial bearings 92 to support generator rotor 74 with a relatively loose fit so that during operation when magnetic bearings 88 and 89 are energized, the rotor has limited, if any contact, with rolling element radial bearings 92, even during times of maximum radial deflections of generator rotor 74 due to perturbations in the operation of magnetic bearings 88. When fluid-film bearings are used in place of magnetic radial bearings 88, rolling element radial bearings 92 are typically not required, although in some applications it may be desirable to include such radial bearings.

In one embodiment, rolling element radial bearings 92 are sized to permit rotor shaft 93 to deviate radially from perfect coaxial alignment with rotational axis 106 an amount that is 1.01 to 5 times as great as the maximum radial deviation of shaft 93 from rotational axis 106 that may occur when magnetic radial bearings 88 are fully activated, including during times of major radial deflection that may occur due to perturbations of the magnetic radial bearings, e.g., from a fluid dynamic instability or a failed control system or a power failure (without backup). In another embodiment, this deviation permitted by radial bearings 92 is about 2 to 3 times as great as the radial deviation of shaft 93 from rotational axis 106 that occurs when magnetic bearings 88 are activated, again including during major perturbations that occur over time. Rolling element radial bearings 92 are often referred to as "bumper bearings" or "backup bearings" in the art.

While beneficial for the reasons discussed above, rolling element radial bearings 92 also present a challenge because the radial clearance of such bearings is much higher than the desired clearances for the conventional seals (not shown in detail) of turbine 24. Typical rolling element radial bearings 92 have a radial clearance on the order of 0.005 to 0.015 inch. By contrast, desired radial clearances for the seals of turbine 24 are typically on the order of 0.000-0.001 inch. As generator 26 is assembled, shipped and stored, or during a loss of levitation of generator rotor 74 during operation due to failure of magnetic bearings 88, the generator rotor will drop to rolling element radial bearings 92. A consequence of such "play" in generator rotor 74 is that portion of shaft 93 proximate rolling element radial bearings 92, along with seals in turbine 24, can be damaged over time. Indeed, in certain applications, as few as 1-10 "bumper" events can cause sufficient damage to components of turbine-generator assembly 20 that disassembly and repair/replacement of such components is required.

A solution to this problem is to add a radial brush seal 94 (FIG. 4) adjacent one or more of magnetic bearings 88 and/or rolling element radial bearings 92, or to substitute a brush seal for the rolling element radial bearings (i.e., the bumper bearings). As used in such context, brush seal 94 is designed to withstand substantial radial forces before deforming. Such deformation is temporary, with brush seal 94 being constructed so that it springs back quickly to its prior configuration. In other words, brush seal 94 is self-healing. The stiffness of each brush seal 94 is selected based upon the weight of generator rotor 74 and turbine rotor 104 (discussed below) coupled with the generator rotor, and the extent of radial movement of the rotors 74 and 104 that is permissible given the overall design and operating parameters, respectively, of generator 26 and turbine 24. In one embodiment, the stiffness of brush seals 94 is selected so that the extent of radial deviation of generator rotor 74 from co-axial alignment with rotational axis 106 that occurs when the rotor is supported by just the brush seals is 1 to 5 times greater than the extent of maximum radial deviation of generator rotor 74 from co-axial alignment with rotational axis 106 that occurs when magnetic bearings 88 are fully activated and supporting generator rotor 74 for rotational movement through the course of normal operation. In another embodiment, such extent of radial deviation is 1.2 to 4 times greater than the extent of radial deviation of generator rotor 74 from co-axial alignment with rotational axis 106 that occurs when magnetic bearings 88 are fully activated and supporting generator rotor 74 for rotational movement through the course of normal operation. In another implementation, generator rotor 74 is free to move a first radial distance out of co-axial alignment with rotational axis 106 when magnetic bearings 88 are not activated and the generator rotor does not move radially more than a second radial distance out of co-axial alignment with rotation axis when supported by brush seals 94. In this implementation, the second radial distance is no more than 0.8 times the first radial distance, and in some implementations ranges from 0.2 to 0.6 times the first radial distance.

Referring now to FIGS. 2 and 4-10, turbine 24 will be described in more detail. In the embodiment illustrated in FIG. 4a, turbine 24 is an overhung axial turbine and includes a housing 98 having an axial inlet 100 and a radial outlet 102. Turbine 24, in one embodiment, is a multi-stage turbine, with the embodiment shown in FIG. 4a having three stages. In other embodiments discussed more below, turbine 24 may be a single-stage overhung radial turbine as show in FIG. 4b, and a multi-stage overhung radial turbine as shown in FIG. 4c. Consistent with this overhung configuration, no radial bearings are included in turbine 24, 324, 424 for radially supporting the rotor in the turbine for rotational movement, As discussed above, turbine 24 is constructed so that the working fluid is expanded as it is transported through the turbine, with the result that the cold end of the turbine, i.e., the end proximate radial outlet 102, is positioned adjacent generator 26. This arrangement reduces heat transfer from turbine 24 to generator 26.

Figure 5:
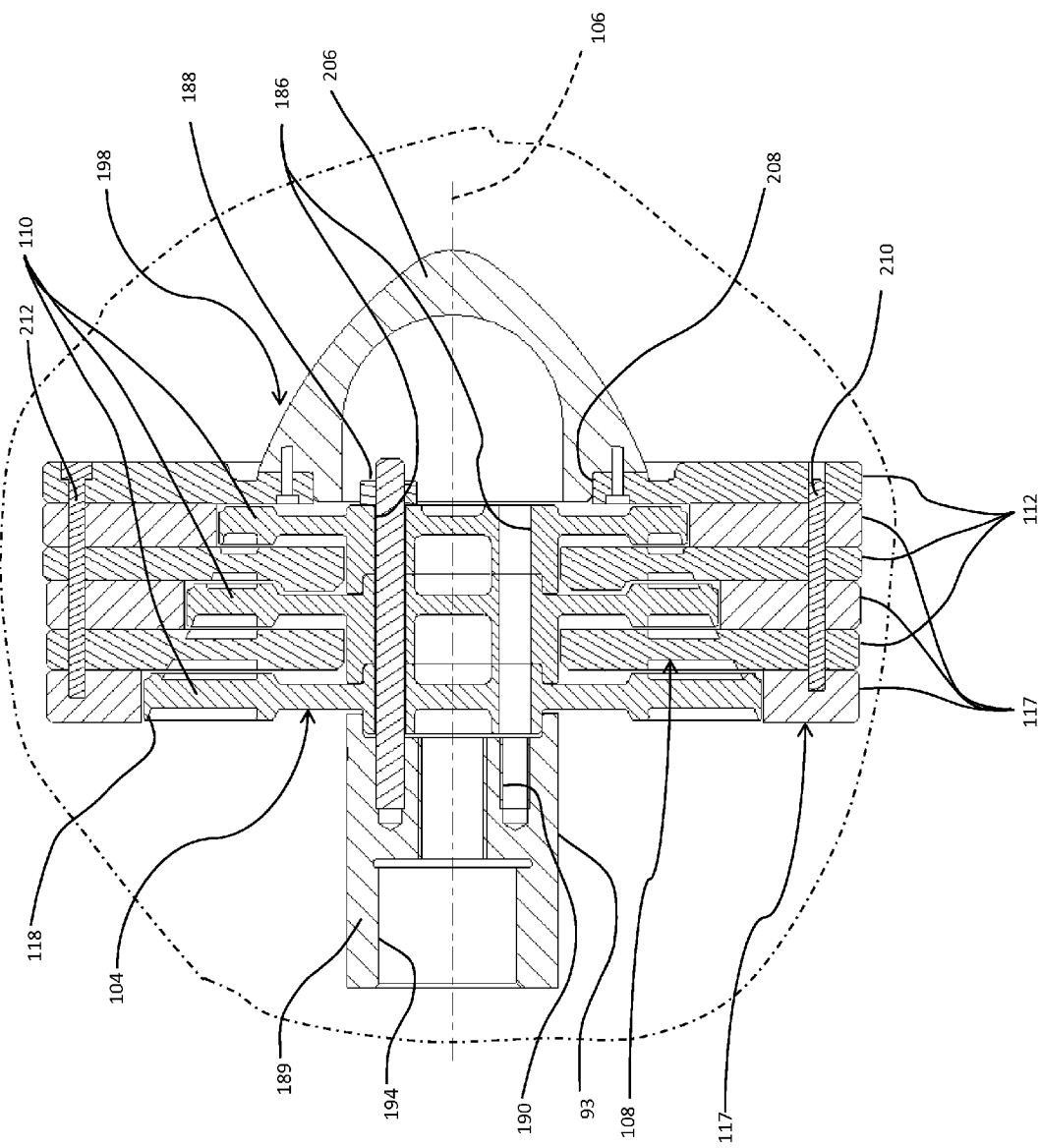
Figure 6:
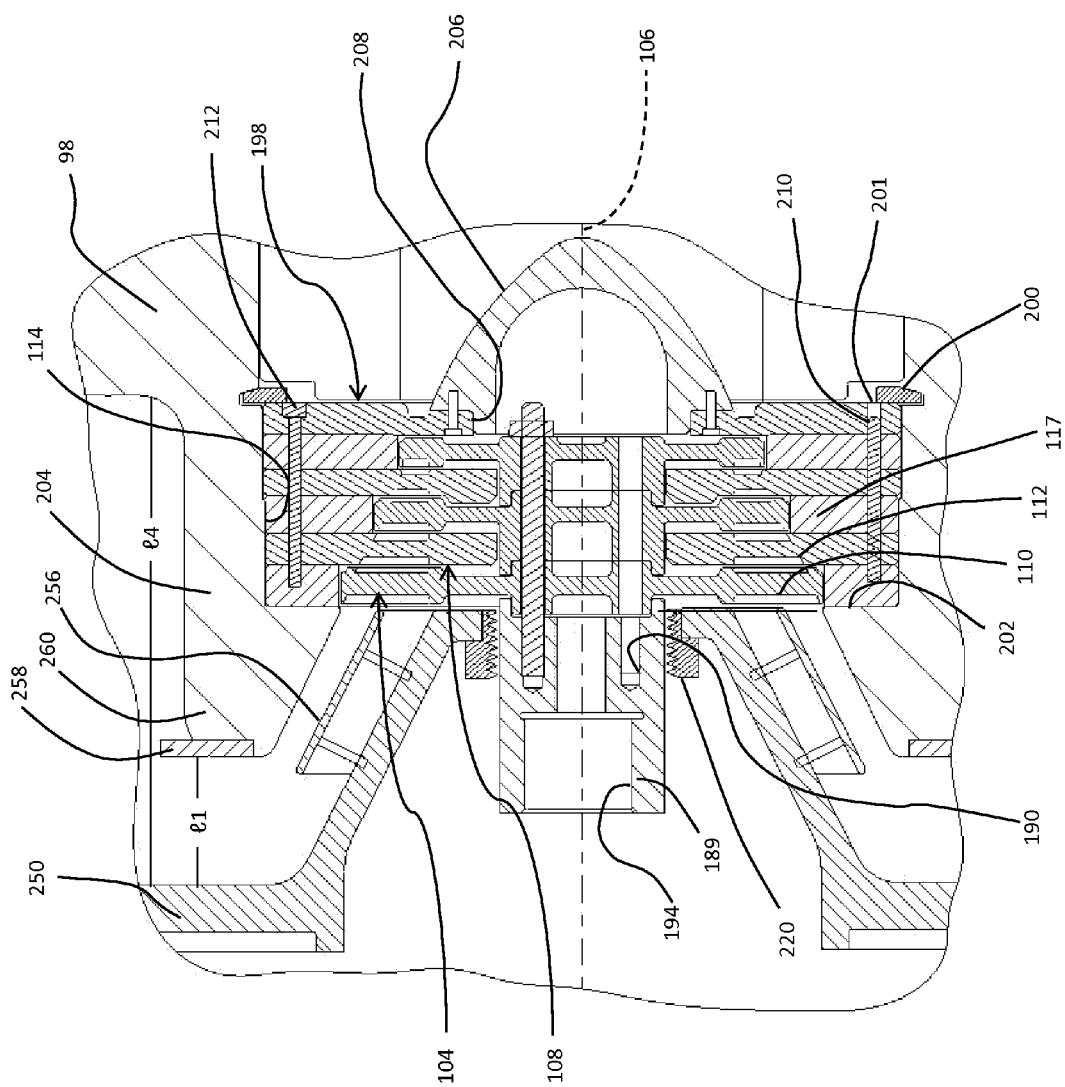
FIG. 6 is an enlarged cross-sectional view of a portion of the turbine shown in FIG. 4a, illustrating a portion of the hood backplate and the entire turbine cartridge.
Figure 9:
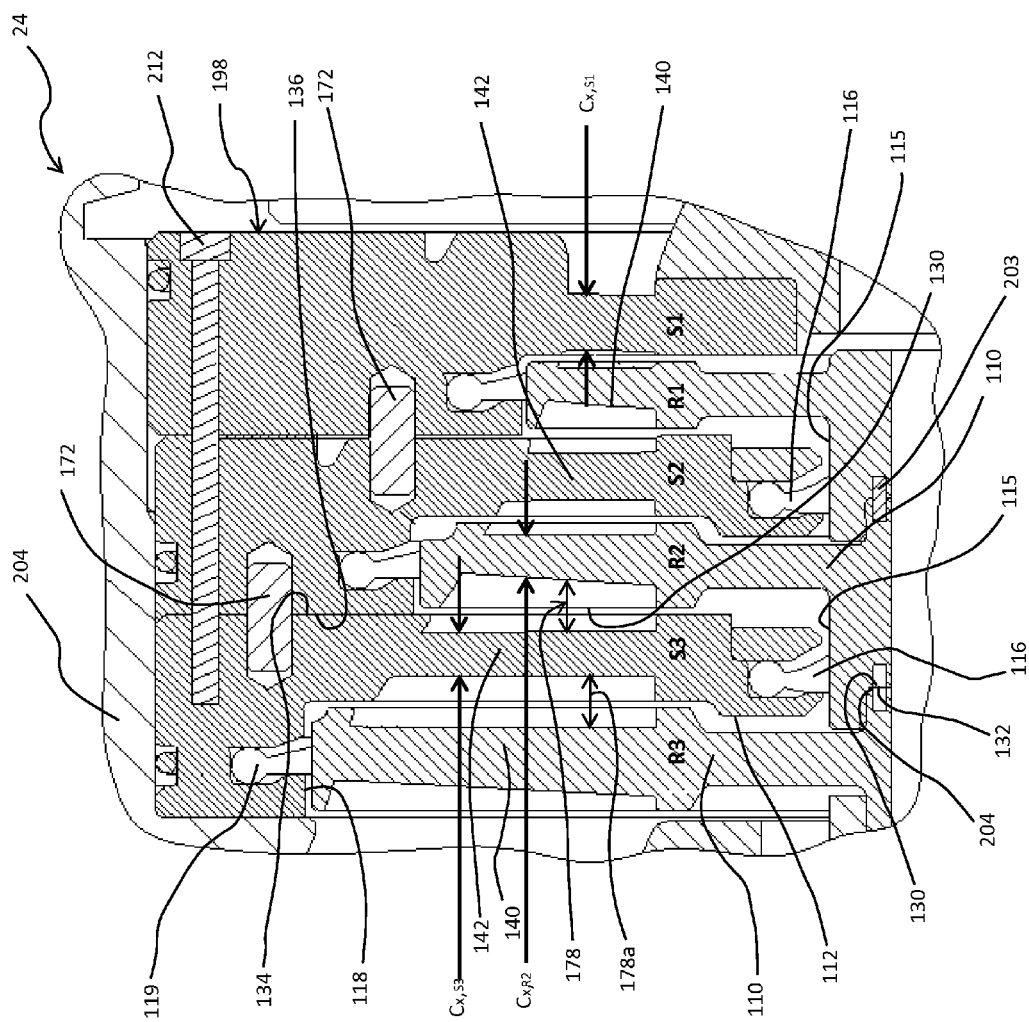
FIG. 9 is a cross-sectional side view of a portion of the turbine shown in FIG. 6 illustrating brush seals and other details of the turbine.
Figure 10:
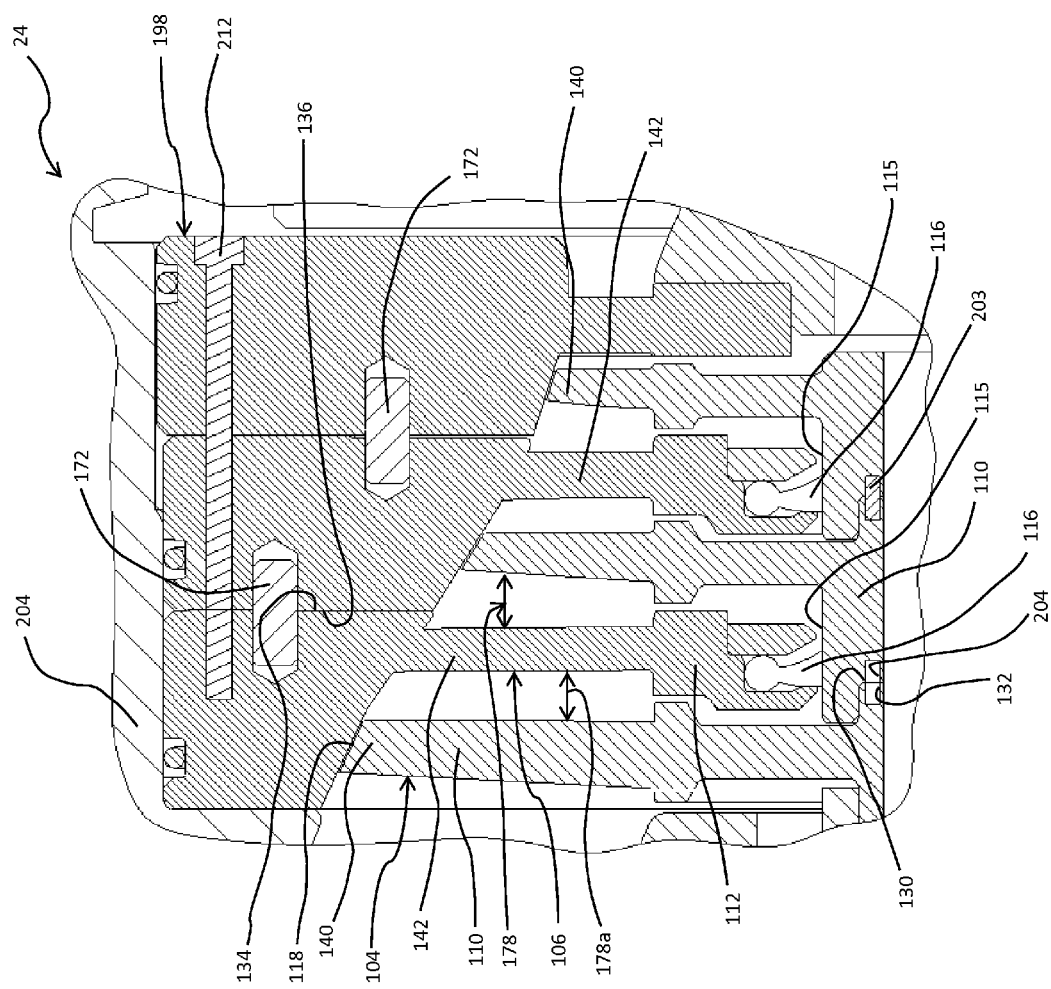
FIG. 10 is similar to FIG. 9, except that it depicts an alternative embodiment of the turbine.

Turbine 24 includes a turbine rotor 104 that rotates about rotational axis 106 and a stator 108 that is fixed with respect to housing 98. As discussed more below, in one example of turbine 24 featuring a modular design, turbine rotor 104 includes a plurality of individual bladed plates 110 and stator 108 includes a plurality of individual plates 112 positioned in alternating, inter-digitated relationship with the rotor plates, as best seen in FIGS. 5, 6 and 9. Rotor plates 110 and stator plates 112 are positioned within housing 98 in the cavity 114 formed at the region between inlet 100 and outlet 102. As best illustrated in FIGS. 9 and 10, radially innermost portions of stator plates 112 are spaced from portions of turbine rotor 104 positioned between rotor plates 110 so as to form a gap 115 sealed by seals 116 provided on such radially innermost portion of the stator plates. In the portion of turbine 24 illustrated in FIG. 5, a plurality of stator spacer segments 117, one corresponding to each rotor plate 110, is provided in alternating, inter-digitated relationship with radially outer portions of stator plates 112. Each spacer segment 117 is positioned radially outwardly of a corresponding respective rotor plate 110. In the alternative embodiments of turbine 24 illustrated in FIGS. 9 and 10, spacer segments 117 are formed as an integral portion of stator plates 112 (spacer segments are not separately labeled in FIGS. 9 and 10). In any event, in each of these embodiments, each spacer segment 117 is sized with respect to its corresponding respective rotor plate 110 so that a gap 118 is provided between a radially outermost portion of the rotor plate and the radially innermost portion of the spacer segment. Seals 119 (see FIG. 9) may be provided in gap 118 in certain embodiments of turbine 24.

As best illustrated in FIGS. 9 and 10, each rotor plate 110 includes a first contact surface 130 and a second contact surface 132 that contacts the first contact surface. Similarly, each stator plate 112 includes a first contact surface 134 and a second contact surface 136 that contacts the first contact surface. Contact surfaces 130, 132, 134 and 136 are substantially flat and substantially parallel. Further, they are arranged to be substantially perpendicular to rotational axis 106. In one embodiment, contact surfaces 130, 132, 134 and 136 are flat in the range 0.00005" to 0.020", and in certain embodiments in the range 0.0005" to 0.005", as measured with respect to a root mean square version of such surfaces. Further, in one embodiment contact surfaces 130 and 132 of rotor plates 110, and contact surfaces 134 and 136 of stator plates 112, deviate from perfectly parallel by an amount in the range 0.0001" to 0.015", and in certain embodiments in the range 0.0005" to 0.005". Spacer segments 117, when provided, preferably have contact surfaces that are similarly flat and parallel to contact surfaces 130, 132, 134, and 136, as discussed above.

Figure 7:
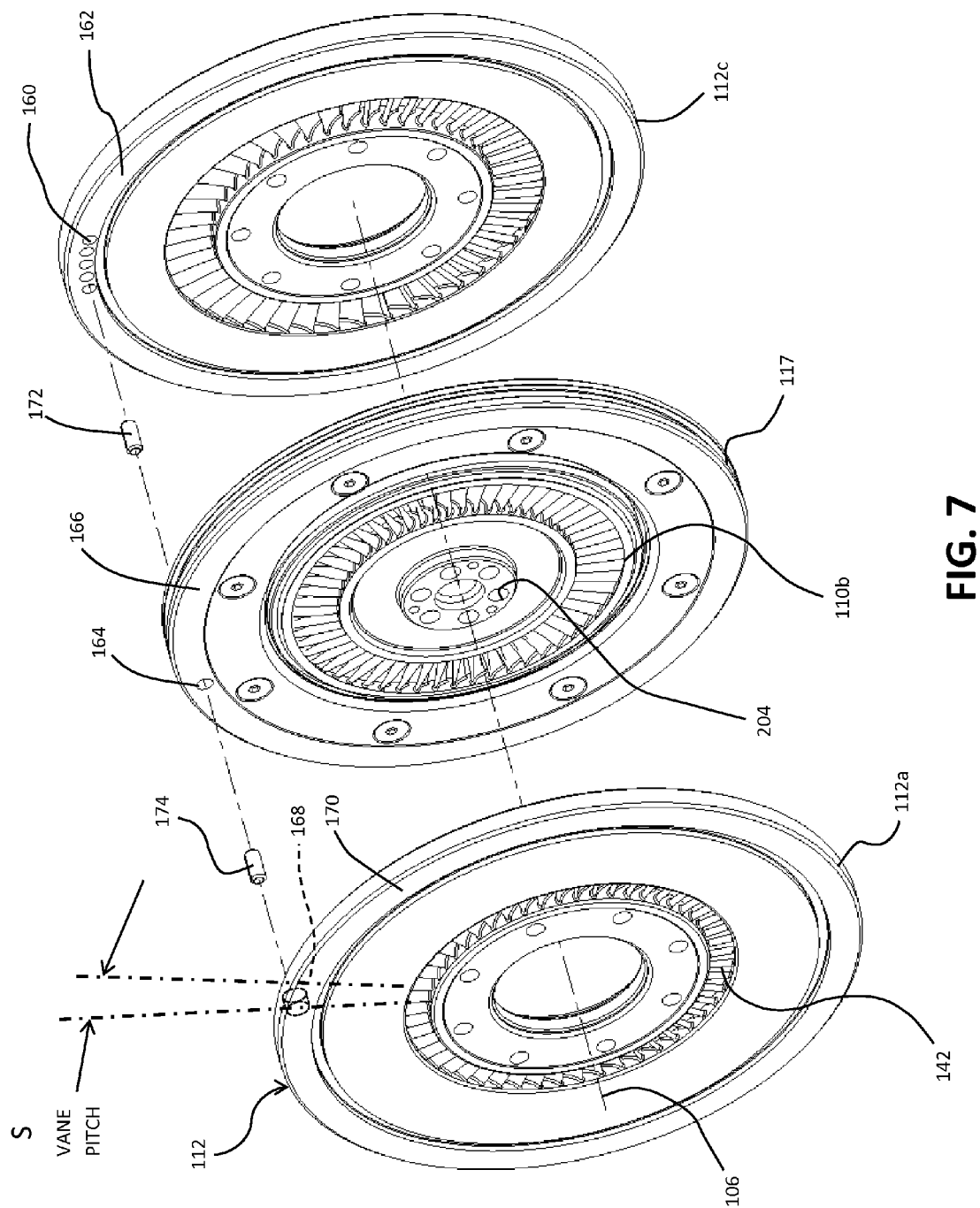
Figure 8:
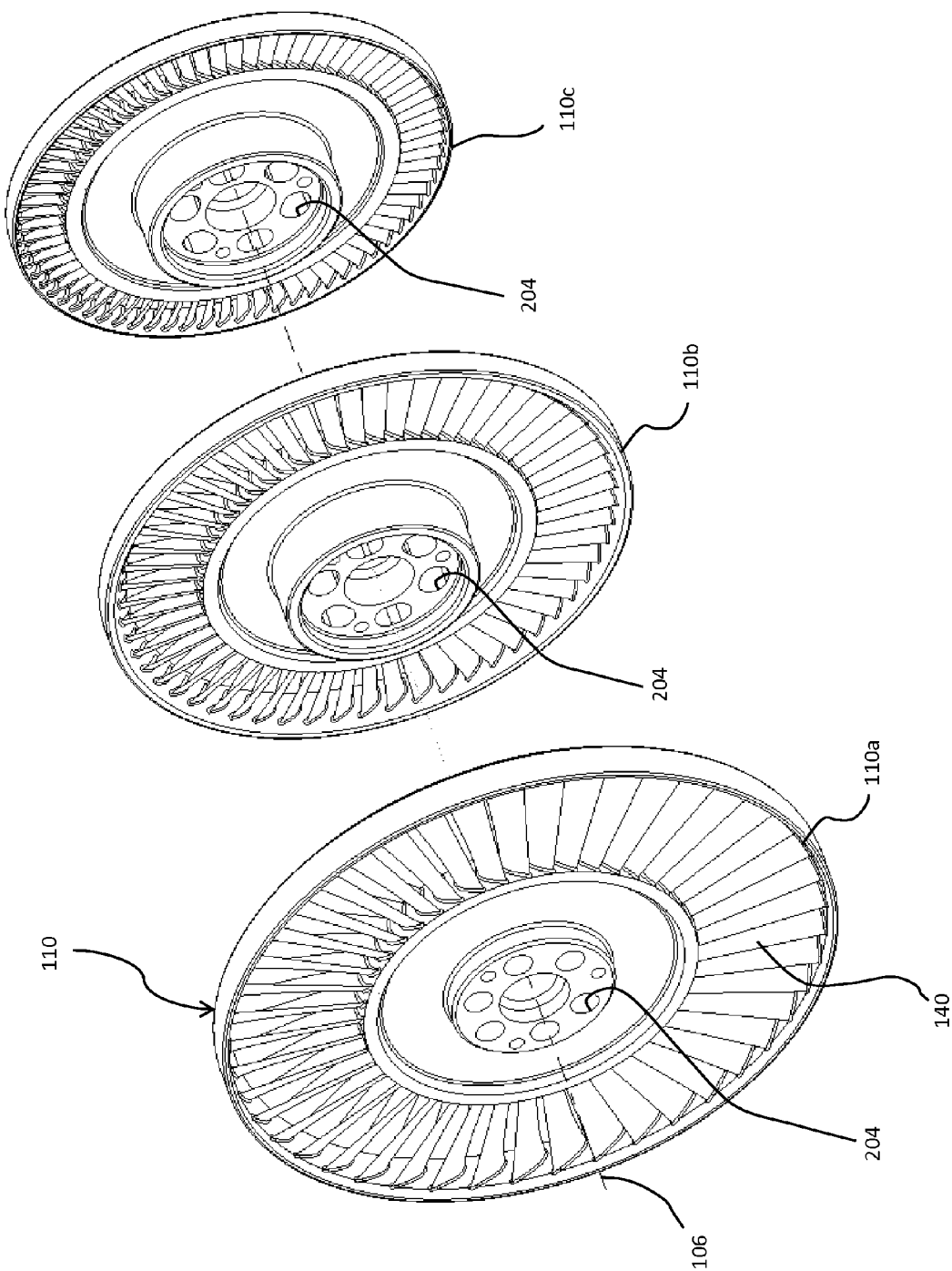
FIG. 8 is a perspective view of three rotor plates used in a multi-stage embodiment of the turbine depicted in FIG. 4a showing the relative placement of the plates.

Referring now to FIGS. 7 and 8, in certain implementations of turbine 24, it may be desirable to circumferentially clock one rotor plate 110 with respect to an adjacent rotor plate, e.g., clocking rotor plate 110a with respect to plate 110b. Similarly, it may be desirable to circumferentially clock one stator plate 112 with respect to an adjacent stator plate, e.g., clocking stator plate 112a with respect to plate 112c. Desired performance specifications for turbine 24 will influence the extent of clocking provided, as those skilled in the art will appreciate. When pairs of rotor plates 110 being clocked both have an equal number of vanes 140, in one embodiment a first rotor plate 110, e.g., plate 110a, is clocked with respect to a second adjacent rotor plate, e.g., plate 110b, zero to one vane pitch, i.e., (0)S to (1)S. Similarly, when pairs of stator plates 112 being clocked both have an equal number of vanes 142, in one embodiment a first stator plate 112, e.g., plate 112a is clocked with respect to an adjacent stator plate, e.g., plate 112c, zero to one vane pitch, i.e., (0)S to (1)S. When pairs of rotor plates 110 being clocked both have an unequal number of vanes 140, in one embodiment a first rotor plate 110, e.g., plate 110a, is clocked with respect to a second adjacent rotor plate, e.g., plate 110b, somewhere in the range of 0 to 360 degrees. Similarly, when pairs of stator plates 112 being clocked both have an unequal number of vanes 142, in one embodiment a first stator plate 112, e.g., plate 112a is clocked with respect to an adjacent stator plate, e.g., plate 112c, somewhere in the range of 0 to 360 degrees. Known turbine flow analytical and experimental methods are used to guide selection of the optimal amount of clocking in this range of 0 to 360 degrees.

With continuing reference to FIGS. 7 and 8, in one embodiment adjacent stator plates 112 are clocked with respect to one another using an alignment system featuring a plurality of circumferentially spaced bores 160 positioned along a peripheral section 162 of a stator plate 112, e.g., stator 112c, only five of which are illustrated in FIG. 7 for convenience of illustration. In one implementation, adjacent bores 160 are circumferentially spaced one vane pitch S. The alignment system also includes a bore 164 in a peripheral section 166 of spacer segments 117. Further, a blind bore 168 may be provided in a peripheral section 170 of a stator plate 112, e.g., stator plate 112a, immediately adjacent the stator plate, e.g., stator plate 112c, in which bores 160 are provided (rotor plate 110b and spacer plate 117 are intervening, of course). In one embodiment, bores 160, 164 and 168 are spaced a substantially identical radial distance from rotational axis 106, and have a substantially identical diameter. The alignment system further includes pin 172, which is sized for receipt, typically using a mild friction fit, in a selected one of bores 160 and in bore 164. When so positioned, pin 172 locks stator plate 112c in selected circumferential alignment with adjacent spacer segment 117. The selected circumferential clocking between adjacent stator plates, e.g., plates 112a and 112c, is achieved by next locking spacer section 117 to stator plate 112a using pin 174 inserted in bores 164 and 168. A similar system for clocking adjacent rotor plates 110 may also be employed, as discussed more below in connection with FIGS. 9 and 10. As discussed above, selection of one of the plurality of bores 160 that receives pin 172 is determined based on the extent of circumferential clocking desired between adjacent stator plates 112. The present invention encompasses other approaches to circumferentially clocking adjacent rotor plates 110 and stator plates 112, as those skilled in the art will appreciate.

With particular reference to FIG. 9, rotor plates 110 and stator plates 112 are, in one implementation, spaced so that axial distance 178 between vanes 140 of a rotor plate 110 and vanes 142 of an adjacent stator plate 112 is in the range of two axial chords to ¼ of 1% of an axial chord, and in certain embodiments ⅓ to 1 chord, as measured with respect to the chord of the immediately upstream one of the rotor or stator plates. For example, vanes 140 of rotor plate 110 identified as R3 in FIG. 9 are axially spaced distance 178a from immediately adjacent vanes 142 of stator plate 112 identified as S3 a chord distance $C_x$,S3 that is in the range of two axial chords to ¼ of 1% of an axial chord, and in certain embodiments is spaced ⅓ to 1 chord. Additionally, the stage reaction for turbine 24 may be of any conventional level. When, however, axial thrust levels must be controlled to meet available thrust capability of generator 26, then very low stage reaction may be desirable, with common values in one example ranging from −0.1 to 0.3 and often falling in the range of −0.05 to +0.15. When very low stage reaction cannot be achieved, for example with multi-stage radial inflow turbine 424 illustrated in FIG. 4c, then the second stage may be reversed so that the two radial turbines work back-to-back, leaving the last stage discharge still facing the generator.

Referring to FIGS. 4-6, 9 and 10, in connection with the assembly of this embodiment, rotor plates 110 and stator plates 112 are positioned in alternating, inter-digitated relationship. In one embodiment, rotor plates 110 include a plurality of bores 186 (see FIG. 5) in radially inner portions of the plates, which bores are sized to receive a fastener, such as bolt stud 188, which extends through the plates and is secured to stub shaft 189 via threaded bores 190 in the stub shaft. Generator rotor shaft 93 may include a threaded male end 192 that is received in a threaded bore 194 in stub shaft 189.

Stator plates 112, and spacer segments 117 if provided, may, for example, be secured together in alternating, inter-digitated relationship so as to form a unitary cartridge 198. The latter may be releasably secured in cavity 114 (FIG. 6) of housing 98 using known fasteners and other devices. In one embodiment, cartridge 198 may be secured in cavity 114 by lock ring 200, which is engaged with a snap fit in a correspondingly sized recess 201 in the cavity. With this construction, when lock ring 200 is installed, stator plates 112, and segments 117 when provided, are driven against shoulder 202 formed in cavity 114 in housing 98, thereby holding the plates and segments securely in place. In certain embodiments of turbine 24, rotor plates 110 may be secured together with pins 203 (see FIGS. 9 and 10) received in bores 204 (see FIGS. 8, 9 and 10) to ensure no relative rotational movement occurs between rotor plates. Similarly, in other embodiments of turbine 24, stator plates 112 and spacers 117 may be secured together with pins 172 (see FIGS. 9 and 10), as discussed above, to ensure no relative rotational movement occurs. Pins 172 may also penetrate into floor 204 of housing 98 (such penetration not being shown) from the downstream-most spacer 117 or stator plate 112, if desired to assure no relative motion. A nose cone 206 may be provided, with one embodiment being threadedly engaged with threaded bore 208 in the furthest upstream stator plate 112 (identified in FIGS. 9 and 10 as S1). Alternatively, machine screws may be used to fasten nose cone 206 to first stator plate 112. With reference to FIGS. 5, 6, 9 and 10, in some implementations it may be desirable to rotationally align and secure together rotor plates 110, stator plates 112, and if provided, spacers 117, using one or more pins 210 and/or one or more bolt studs 212 that extend through the rotor plates, stator plates and spacers. Pins 210 may be used for precision rotational alignment of rotor plates 110, stator plates 112 and spacers 117, and if received in these components with a sufficient force fit, may also hold these components together to form a unitary structure, namely unitary cartridge 198. Bolt studs 212, in addition to providing some measure of rotational alignment, also draw together the rotor plates, stator plates and spacers to form a unitary structure, namely unitary cartridge 198.

By providing separate rotor plates 110 and stator plates 112, and by making such plates relatively flat as discussed above, these plates may be assembled as a cartridge 198 (see FIG. 5) that may be positioned in and removed from cavity 114 in housing 98 as a unitary assembly. As discussed more below, the provision of cartridge 198 permits a universal turbine 24 to be readily adapted for its intended application and interchanged for maintenance or new loading requirements.

In some applications, it will be desirable to more substantially isolate generator 26 from turbine 24. To achieve this objective, as best illustrated in FIG. 6, it may be desirable to include a seal 220 surrounding stub shaft 189 of turbine 24 proximate the radially innermost portion of backplate 250. Seal 220 may be implemented as a labyrinth seal, a brush seal, a close-tolerance ring seal or using other seals known in the art.

The embodiment of turbine 24 shown in FIGS. 4-6, is designed to permit ready manufacture of versions of the turbine having differently sized rotors 104 and stators 108. By providing a single housing 98 for turbine 24 while permitting construction of turbines with varying operating parameters using that single housing, the turbine can be manufactured on a cost-efficient basis to the specifications of a given application. This flexible design is achieved in part by designing and sizing housing 98 of turbine 24 so that the largest-diameter turbine rotor 104 contemplated for the turbine may be received within cavity 114 and through the use of the cartridge design discussed above. In particular, after the desired operating parameters of turbine 24 are determined for the application in which the turbine will be used, then the number and size of plates 110 used in turbine rotor 104, and plates 112 and spacer segments 117 used in stator 108, are determined.

Consistent with the objective of providing a turbine 24 that can be readily modified to meeting desired operating parameters, housing 98 is designed to facilitate such modification. One aspect of such design of housing 98 involves providing floor 204 with a thickness sufficient to accommodate turbine rotor 104 and stator 106 having varying radial heights. Δr, as measured between said rotational axis and an outermost portion of said at least one turbine rotor, said axial turbine including a hood having a floor with a first thickness, wherein said first thickness is selected to permit said floor to be machined on the inside to a thickness sufficient to accommodate said at least one turbine rotor with a radial dimension that varies between Δr and 1.4Δr. Further, housing 98 is provided with a configuration that permits easy access to floor 204 by conventional machine tools, e.g., a 5-axis CNC milling machine or a CNC lathe, that can be used to machine the floor so as to create a cavity 114 sized to receive turbine rotor 104 and stator 106 with the desired radial heights.

Another aspect of providing a modifiable housing 98 is to include a backplate 250 having a thickness that may be adjusted so as to selectively vary width l4, i.e., the distance l4 between backplate 250 and housing wall 252, and to selectively vary width l1, i.e., the exit width. In this regard, width l4 may be varied so that it ranges from one half to four times the width of diffuser exit l1. Backplate 250 may be an integral portion of housing 98 in some embodiments and a separate element in others, as illustrated in FIG. 4. Backplate 250 preferably includes one or more ports 254 through which vapor in gap 70 may be exhausted and delivered to the exhaust flow path of turbine 24 and ultimately via fluid connection 34 to condenser 36. If desired, flow splitter 256 may be provided immediately downstream of turbine rotor 104 and stator 106 as another way to tailor the performance of turbine 24. As another optional feature, an extension plate 258 may be added to nose 260 of floor 204 of housing 98, as best seen in FIG. 6.

Housing performance depends on several factors, but alignment of the entry flow at the housing inlet 100 and housing base dimensions are important as taught in the literature. A very good flow entry provides for diffuser exhaust flowing up the housing backplate 250, as configured in FIG. 4. An essential design variable is to set L4=l4/l1 to a value of 0.5 to 4, often in the range of 2 to 3, in order to have high performance (maintaining good diffuser Cp). This means that the diffuser exit width (l1) and the hood floor width (l4) must be controlled. The exit width l1 also controls the performance of the diffuser as it controls the diffuser overall area ratio, which is a first order design parameter; hence a conflict can arise. If l1 is increased for the diffuser, it will hurt the housing. This is controlled by starting with a generous housing design to cover a wide range of power levels (up to 5 MW for certain designs) and then adjusting operating parameters by modifying backplate 250 and the nose 260 of floor 204. Another design variable is to introduce diffuser splitter 256 (FIG. 6), which gives independent control on l1, thereby permitting a selected change in the diffuser exit value. Further performance tailoring can be achieved by selection of an extension plate 258 (FIG. 6) of suitable height and thickness.

Figure 4A:
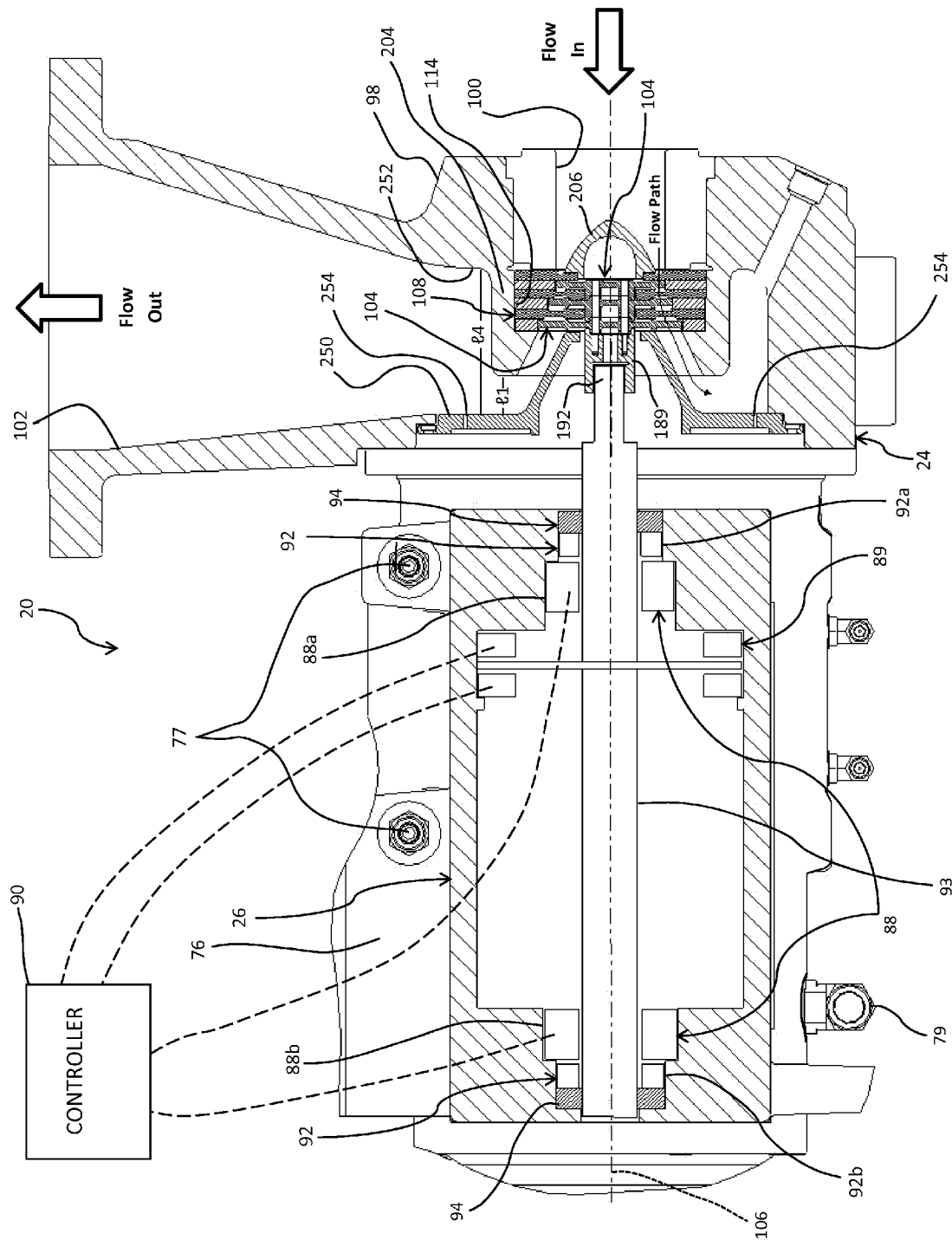
FIG. 4a is a cross-sectional view of a multi-stage axial turbine embodiment of the turbine assembly depicted in FIG. 1 and a partially broken-away view of the generator depicted in FIG. 1 showing, schematically, bearings included in one embodiment of the generator, with the rotor and stator of the generator removed for clarity of illustration.
Figure 4B:
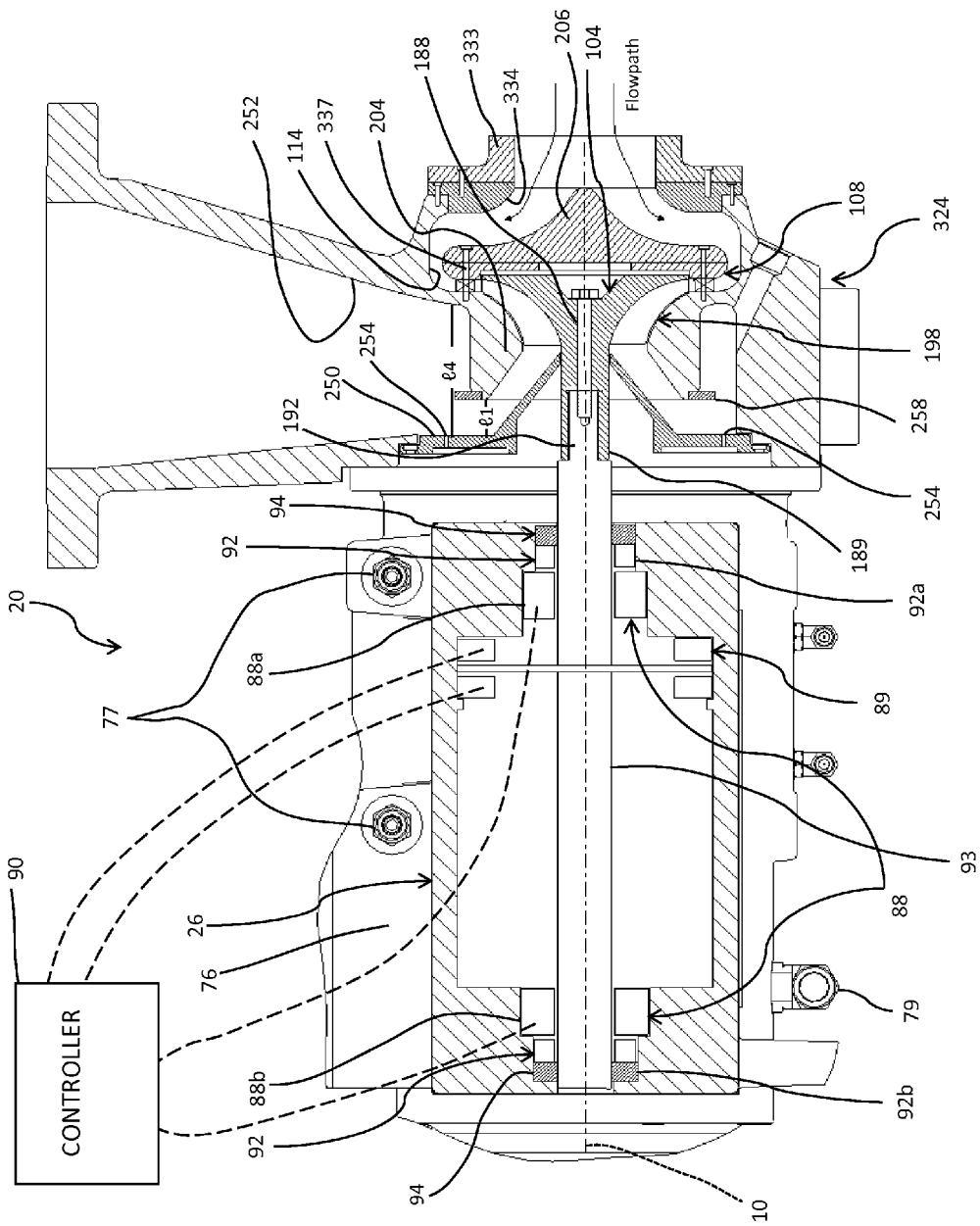
FIG. 4b is similar to FIG. 4a, except that a single-stage radial turbine embodiment of the turbine assembly depicted in FIG. 1 is shown.

Turbine 24 is depicted in FIG. 4a as a multi-stage axial turbine 24, but turbine-generator system 20 is not so limited. In this regard, and with reference to FIG. 4b, in an alternative embodiment, turbine-generator system 20 may include a radial turbine 324 having a single stage. Like numbers are used in FIG. 4a and FIG. 4b to identify like elements, and for brevity, a description of like elements is omitted in connection with the following description of radial turbine 324. The latter includes a single rotor 104 and a single stator 108. Like the axial turbine 24 depicted in FIG. 4a, radial turbine 324 may be implemented as a unitary cartridge 198 that may be releasably secured to generator shaft 93 with a bolt stud 188. Turbine 324 may include an inlet flange ring 333, and an outer flow guide 334 attached to housing 98 with known fasteners. Nose cone 206 and stator 108 may be releasable secured to housing 98 with a known fastener, such as bolts 337.

Figure 4C:
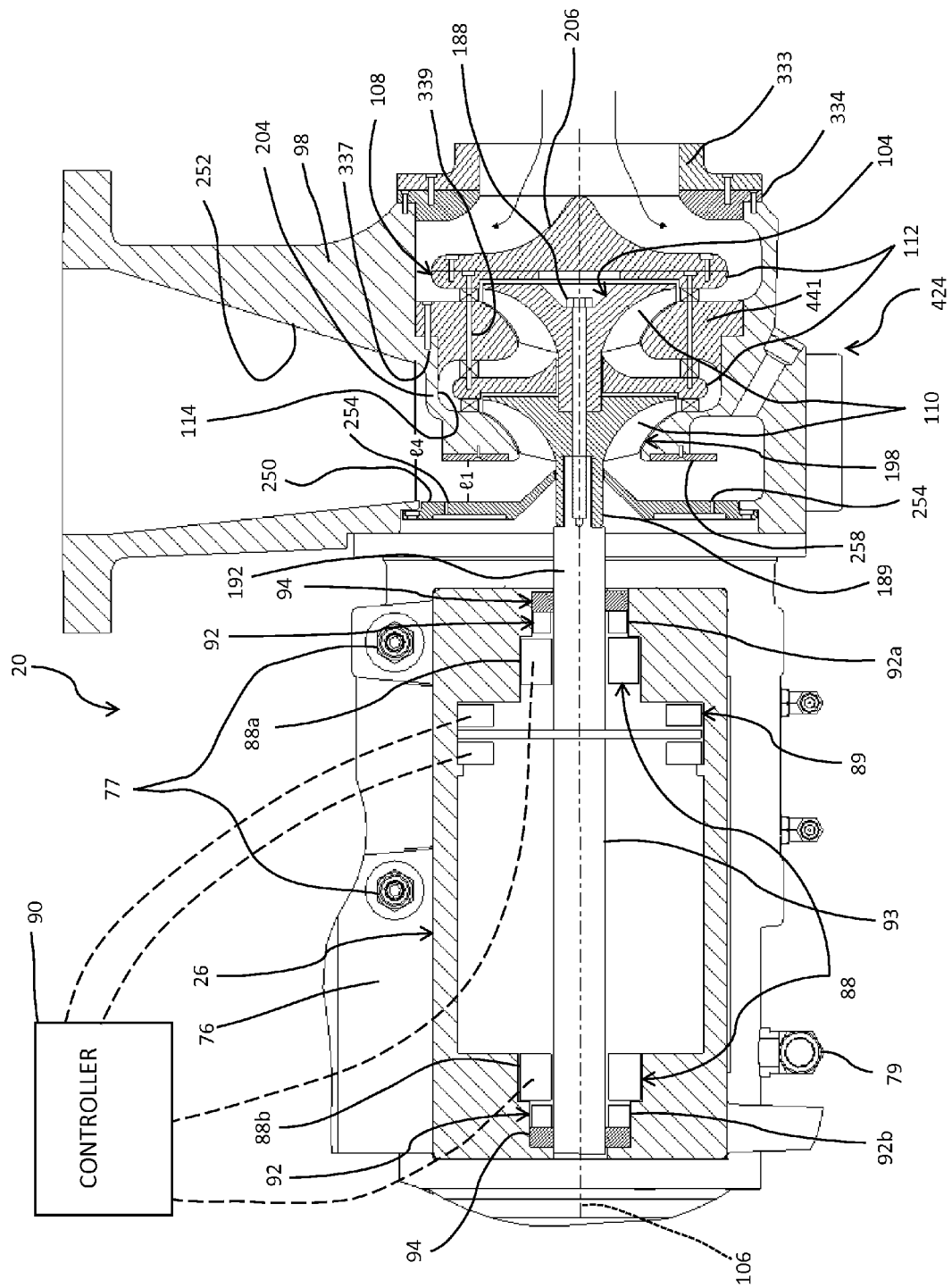
FIG. 4c is similar to FIG. 4b, except that a multi-stage radial turbine embodiment of the turbine assembly depicted in FIG. 4b is shown.

Turning next to FIG. 4c, in an alternate embodiment, turbine-generator system 20 may include a multi-stage radial turbine 424. Like numbers are used in FIG. 4a and FIG. 4b to identify like elements, and for brevity, a description of like elements is omitted in connection with the following description of radial turbine 424. The latter includes two rotors 104 and two stators 108. Radial turbine 424 may be implemented as a unitary cartridge 198 that may be releasably secured to generator shaft 93 with a bolt stud 188. Turbine 424 may include an inlet flange ring 333, and an outer flow guide 334 attached to housing 98 with known fasteners. Nose cone 206 and stators 108, together with intermediate flow guide 441 positioned between the stators, may be releasable secured to housing 98 with a known fastener, such as bolts 337. The two stators 108 of turbine 424 and intermediate flow guide 441 may be secured together with bolts 339 or other known fasteners so as to create unitary cartridge 198. Intermediate flow guide 441 is functionally analogous to stator spacers 117 in the version of turbine 24 illustrated in FIGS. 5 and 6.

Figure 4D:
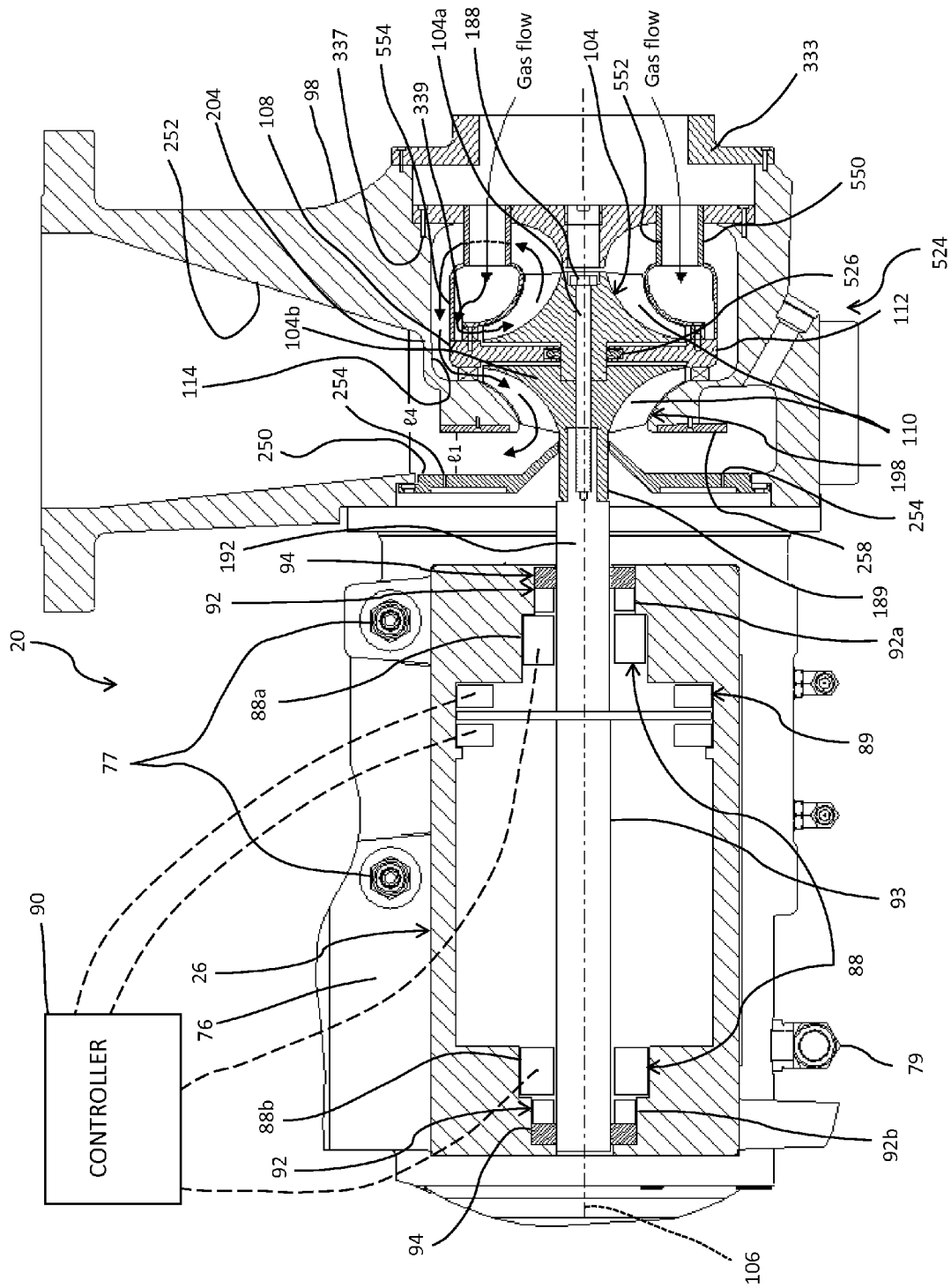
FIG. 4d is similar to FIG. 4c, except that the rotors of the multi-stage radial turbine assembly depicted in FIG. 4c are arranged in back-to-back configuration.

Depending on the desired balancing of thrust in turbine-generator system 20, it may be desirable to configure rotors 104 of a multi-stage radial turbine in a back-to-back arrangement, as illustrated in FIG. 4d with respect to radial turbine 524. In this regard, rotor 104a is positioned so it backs up to rotor 104b, with the rotors being coupled to rotate together. Stator 108 is positioned between rotors 104a/104b, and includes bearings 526 for rotatably supporting a portion of rotor 104b that extends through the stator. Turbine 524 further includes a front face plate 550 through which gas transfer tubes 552 extend, with the gas transfer tubes terminating at interior plenum 554. Gas flow entering turbine 524 flows into tubes 552, is delivered to interior plenum 554, exits the plenum causing rotor 104a to rotate, flows over stator 108, then drives rotor 104b and finally exits the turbine.

Although not specifically illustrated, turbine-generator system 20 may also be implemented using a mixed-flow turbine. The latter is very similar in design to radial turbine generators 324 and 424, and so is not separately illustrated.

By placing rotor 104 in a reverse orientation so that the low-pressure, cooled working fluid is discharged from the last rotor stage of turbine 24 proximate generator 26, heat transfer to the generator is minimized, thereby prolonging generator life. The low-pressure exhaust of turbine 24, as a consequence of its reverse orientation, draws the second volume of working fluid out of gap 70 in generator 26 via ports 254 and into the discharge stream of turbine 24 while balancing thrust forces sufficiently so that the generator thrust bearing 89 can handle the remaining axial load of turbine 24. Such a design is efficient, compact and thermally efficient.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for conversion of heat energy into electricity, the system comprising:
   an electric generator having a proximal end, a distal end, a generator rotor and a stator, said generator rotor being disposed for rotational movement within said stator about a rotational axis, said generator also including a first magnetic radial bearing positioned adjacent said proximal end, and a second magnetic radial bearing positioned adjacent said distal end, said first and second magnetic radial bearings surrounding said generator rotor and retaining said generator rotor, during operation, in substantially coaxial alignment with respect to said rotational axis; and
   a turbine having at least one stator and at least one turbine rotor supported for rotational movement relative to said at least one stator about said rotational axis, said at least one turbine rotor being coupled with said generator rotor so as to rotationally drive said generator rotor, said turbine having a first end attached to said proximal end of said generator, wherein said at least one stator includes a plurality of stator plates, said at least one turbine rotor includes a plurality of turbine rotor plates, and said stator plates and turbine rotor plates have substantially flat contact surfaces.

2. A system according to claim 1, wherein said electric generator has a power output of less than 600 KW.

3. A system according to claim 1 wherein said turbine is a multi-stage turbine and said at least one stator includes a plurality of stators and said at least one turbine rotor includes a plurality of rotors.

4. A system according to claim 1, wherein said turbine includes a housing and said plurality of stator plates and said plurality of turbine rotor plates together form a unitary cartridge that is releasably mounted in said housing.

5. A system according to claim 1, wherein said generator includes at least one brush seal extending radially inwardly toward said generator rotor and a brush seal seat positioned radially inwardly of said at least one brush seal a first distance selected to permit said at least one brush seal to contact said brush seal seat, said at least one brush seal being sized and configured to support said generator rotor during startup and shut down, before said one of said first and second magnetic bearings are fully activated, so as to maintain said generator rotor in substantially coaxial alignment with respect to said rotational axis.

6. A system according to claim 5, wherein said generator rotor is free to move a first radial distance out of coaxial alignment with said rotational axis when said first and second magnetic radial bearings are not activated to radially support said generator rotor, further wherein said at least one brush seal has a radial length and rigidity selected to support said turbine rotor so that said turbine rotor, and in turn said generator rotor coupled to said turbine rotor, do not deviate more than a second radial distance out of co-axial alignment with said rotational axis, said second radial distance being less than 0.8 times said first radial distance.

7. A system according to claim 6, wherein said at least one brush seal is spaced 0.0000" to 0.010" from said seat.

8. A system according to claim 6, wherein said second radial distance is 0.3 to 0.6 times said first radial distance.

9. A system according to claim 1, wherein said generator includes at least one rolling element bearing adjacent at least one of said first magnetic radial bearing and said second magnetic radial bearing for rotationally supporting said generator rotor.

10. A system according to claim 1, wherein said turbine is an axial turbine.

11. A system according to claim 1, wherein said turbine is a radial turbine.

12. A system according to claim 1, wherein said turbine is a mixed-flow turbine.

13. A system according to claim 1, wherein said at least one turbine rotor has a radial dimension Δr, as measured between said rotational axis and an outermost portion of said at least one turbine rotor, said axial turbine including a hood having a floor with a first thickness, wherein said first thickness is selected to permit said floor to be machined to a thickness sufficient to accommodate said at least one turbine rotor with a radial dimension that varies between Δr and 1.4 Δr.

14. A system according to claim 1, further including a hood having a removable backplate with a surface, a hood wall opposite said backplate, and a diffuser passage exit having a width l1, wherein said backplate surface is spaced a distance l4 from said hood wall, wherein said distance l4 ranges between one half and four times said distance l1.

15. A system according to claim 14, wherein said backplate has a thickness selected to permit said backplate to be machined so that said distance l4 is between one half and four times said distance l1.

16. A system according to claim 1, wherein adjacent ones of said plurality of turbine rotor plates include structures that co-act to maintain alignment of said adjacent ones of said turbine rotor plates.

17. A system according to claim 16, wherein said structures include said contact surfaces.

18. A system according to claim 1, wherein said contact surfaces are substantially parallel to one another.

19. A system according to claim 1, wherein said contact surfaces are flat in the range 0.00005" to 0.020" as measured with respect to a root mean square version of such surfaces.

20. A system for conversion of heat energy into electricity, the system comprising:

an electric generator having a proximal end, a distal end, a generator rotor and a stator, said generator rotor being disposed for rotational movement within said stator about a rotational axis, said generator also including a first fluid film bearing positioned adjacent said proximal end, and a second fluid film bearing positioned adjacent said distal end, said first and second fluid film bearings surrounding said generator rotor and retaining said generator rotor, during operation, in substantially coaxial alignment with respect to said rotational axis; and a turbine having at least one stator and at least one turbine rotor supported for rotational movement relative to said at least one stator about said rotational axis, said at least one turbine rotor being coupled with said generator rotor so as to rotationally drive said generator rotor, said turbine having a first end attached to said proximal end of said generator, wherein said at least one stator includes a plurality of stator plates, said at least one turbine rotor includes a plurality of turbine rotor plates, and said stator plates and turbine rotor plates have substantially flat contact surfaces.

21. A system according to claim 20, wherein said electric generator has a power output of less than 600 KW.

22. A system according to claim 20, wherein said turbine includes a housing, said at least one stator includes a plurality of stator plates, and said at least one turbine rotor includes a plurality of turbine rotor plates, further wherein said plurality of stator plates and said plurality of turbine rotor plates together form a unitary cartridge that is releasably mounted in said housing.

23. A system according to claim 20, further including a hood having a removable backplate with a surface, a hood wall opposite said backplate, and a diffuser passage exit having a width l1, wherein said backplate surface is spaced a distance l4 from said hood wall, wherein said distance l4 ranges between one half and four times said distance l1.

24. A system according to claim 20, wherein adjacent ones of said plurality of turbine rotor plates include structures that co-act to maintain alignment of said adjacent ones of said turbine rotor plates.

25. A system according to claim 24, wherein said structures include said contact surfaces.

26. A system according to claim 20, wherein said contact surfaces are substantially parallel to one another.

27. A system according to claim 20, wherein said contact surfaces are flat in the range 0.00005" to 0.020" as measured with respect to a root mean square version of such surfaces.

* * * * *